Feb. 8, 1949.     H. J. KENT     2,461,066
SHOCK ABSORBER

Filed Feb. 3, 1945     2 Sheets-Sheet 1

INVENTOR
H. J. Kent
by
E. H. Fetherstonhaugh
ATTORNEY

Feb. 8, 1949.       H. J. KENT       2,461,066
SHOCK ABSORBER

Filed Feb. 3, 1945                 2 Sheets-Sheet 2

INVENTOR
H. J. Kent
by
E. M. Fetherstonhaugh
ATTORNEY

Patented Feb. 8, 1949

2,461,066

UNITED STATES PATENT OFFICE 2,461,066

SHOCK ABSORBER

Henry John Kent, Toronto, Ontario, Canada

Application February 3, 1945, Serial No. 575,957

3 Claims. (Cl. 267—34)

The invention relates to improvements in shock absorbers as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to devise a shock absorber that will have a cushioning medium for absorbing shocks given to flying machines on landing and take-offs, as well as road vehicles and other mechanisms; to construct a shock absorber having the minimum of working parts, easy to assemble and having its various parts accessible for repairs or replacements; to create a stronger and more constant elastic means for taking up the shocks and which will automatically self-regulate itself in accordance with the amount of pressure exerted thereon; to simplify the construction of shock absorbers and increase its efficiency through combining mechanical and fluid means to accomplish its purpose; to ensure a positive action and minimize the amount of strain on the working parts of the device that is usually caused through the attempted cushioning of heavier shocks that may be beyond the capabilities of the average shock absorber; and generally to provide a device that will be economical to maintain, easy to construct and efficient for its purpose.

In the drawings.

Like numerals of reference indicate corresponding parts in the various figures.

Figures 1, 4:
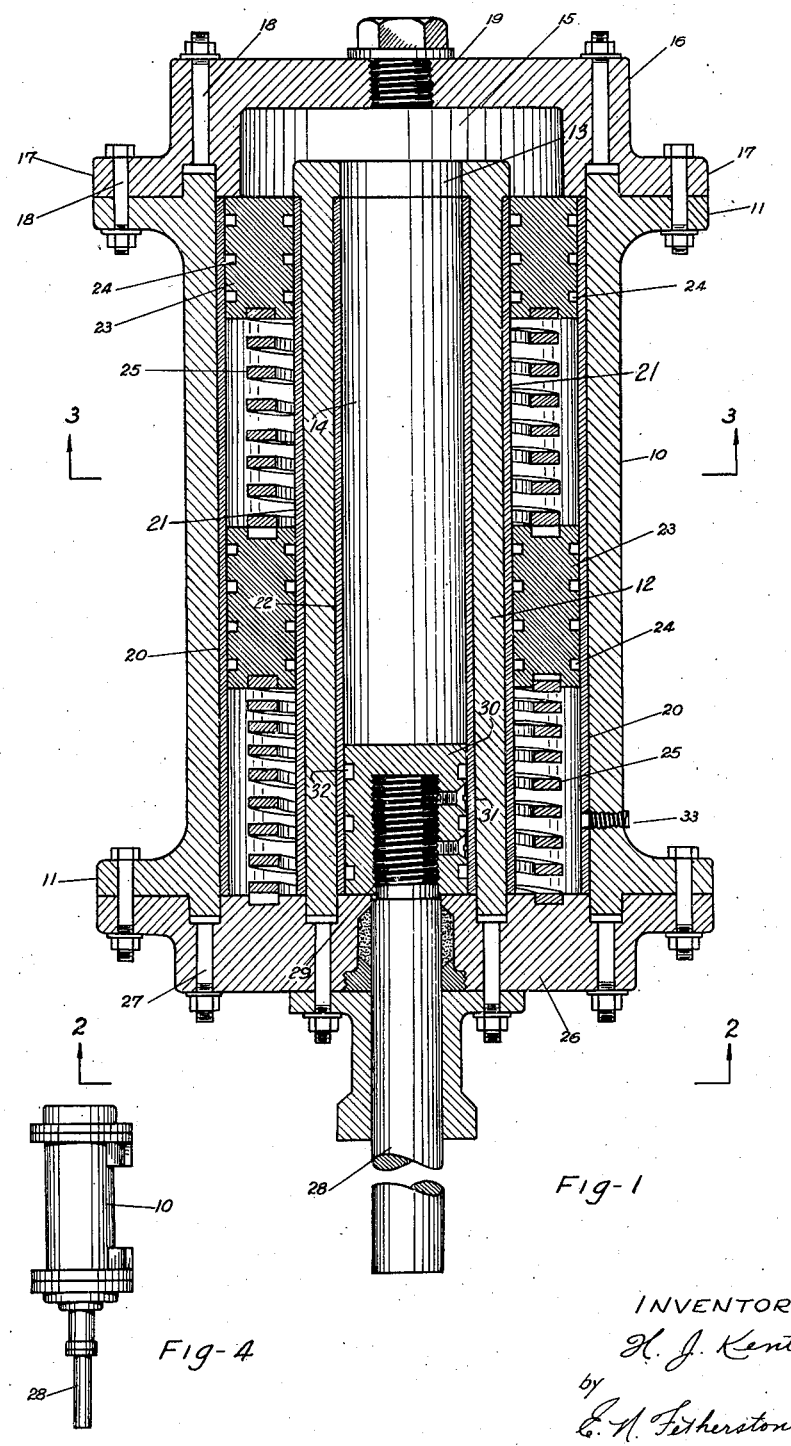
Figure 1 is a side sectional view of the device.
Fig. 4 is a side elevation of the device.
Figure 2:
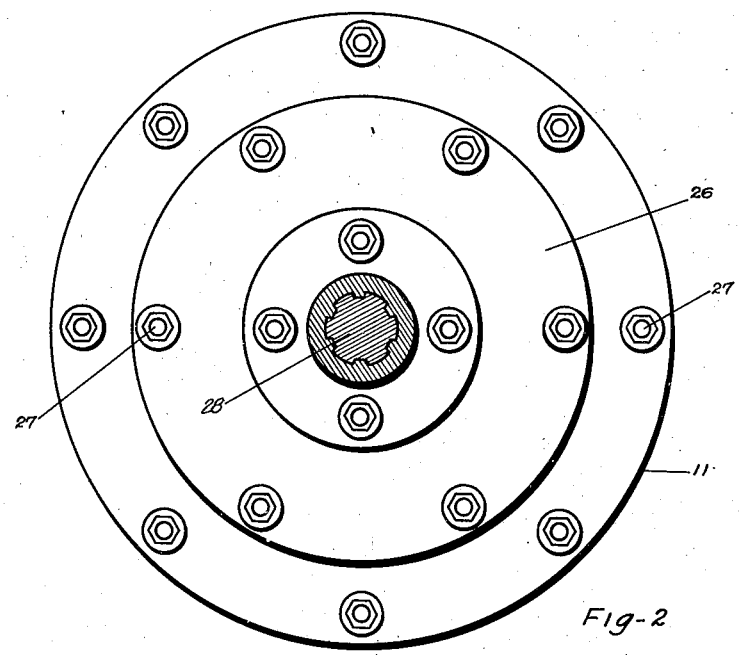
Figure 2 is a cross sectional view as taken on the lines 2—2 in Figure 1.
Figure 3:
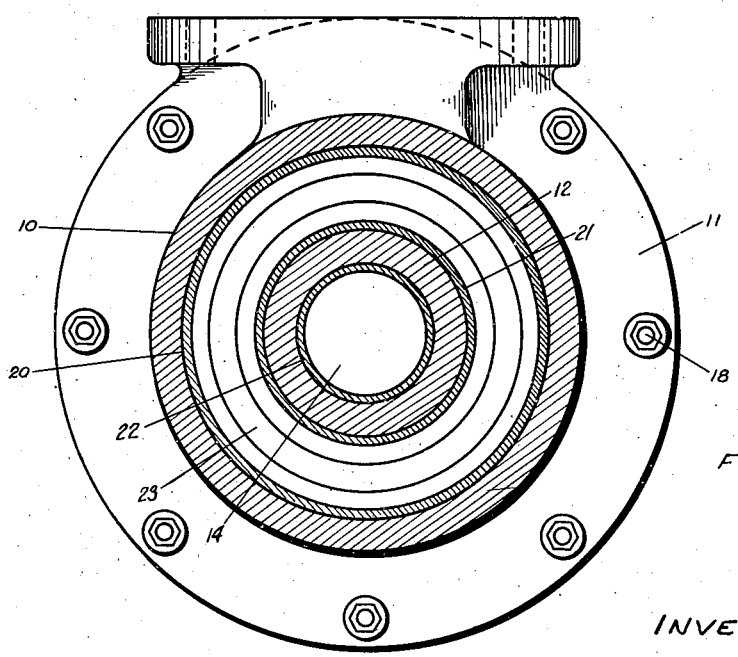
Figure 3 is a cross sectional view as taken on the lines 3—3 in Figure 1.

Referring to the drawings, the shock absorber consists of an outer cylinder, as indicated by the numeral 10 and is provided with the flanged ends 11. An inner cylinder 12 is located within the outer cylinder and extends at a higher elevation than the outer cylinder for the purpose of forming a fluid channel 13 for connecting the fluid chamber 14 in the inner cylinder 12 to the fluid passage 15 which leads into the space formed between the inner and outer cylinders. A cap 16 having the flange 17 is secured to the outer cylinder by means of the fastening members 18 and has an enlarged inner area to complete the fluid passage 15 and is also provided with a fluid inlet 19. The liners 20 and 21 abut the inner and outer surfaces of the outer and inner cylinders respectively, while the liner 22 abuts the inner circumference of the inner cylinder 12. Between the outer and inner cylinders are located a plurality of cylindrical members 23 which encircle the inner cylinder and are provided with the usual piston rings 24, these cylindrical members engage with the resilient springs 25 which are located beneath the underside of the cylindrical members and encircle the inner cylinder 12.

The lower ends of the outer and inner cylinders are closed in by the flange cover 26 by means of the fastening members 27 and provided with a central orifice through which a spline shaft 28 projects. The upper end of the spline shaft being externally threaded at 29 and held in tight engagement with the piston 30 by means of the set screw 31, the piston 30 being provided with the piston rings 32 and this piston is adapted to reciprocate within the inner cylinder through the force effected by the spline shaft and in that way causes a pressure on the fluid contained in the chamber and the passage respectively which in turn will expel a force directly on the cylindrical members, this force being absorbed through the resilient members 25, which are in the form of springs, a fluid release valve 33 may be introduced through the space formed between the inner and outer cylinders for expelling any surplus fluid.

In the operation of this invention the shock absorber is suitably mounted to the underside of a flying machine or road vehicle, and in turn is connected to the undercarriage, therefore when there is any shock given to the undercarriage, this will have the effect of causing the spline shaft and its accompanying piston to create a pressure on the fluid, contained in the device, and this in turn will effect a pressure on the resilient means located between the outer and inner cylinders and in that way the shock is greatly absorbed before it reaches the body of the vehicle or flying machine.

It is of course understood that this shock absorber may be used for other mechanisms without in any way departing from the essential features of this invention.

What I claim is:

1. In shock absorbers, an outer cylinder, an inner cylinder, a cap enclosing said outer cylinder at one end thereof, a cover enclosing said outer and inner cylinders at the opposite end thereof, cylindrical members providing a cushioning means and located between said outer and inner cylinders, resilient springs encircling said inner cylinder and engaging with said cylindrical members, a piston located in said inner cylinder, a shaft secured to said piston, a fluid passage connecting the fluid chamber in said inner cylinder with the annular space formed between the latter and said outer cylinder.

2. In shock absorbers, an outer cylinder, an inner cylinder, a cover closing one end of said outer cylinder and completing a fluid passageway from the inner cylinder to the space formed between the outer and inner cylinders, a cover closing the other end of said outer and inner cylinders, cylindrical members in the form of annular pistons located between said outer and inner cylinders, said cylindrical members slidably engaging said inner and outer cylinders, resilient springs encircling said inner cylinder and engaging with said cylindrical members, a piston located in said inner cylinder, and a shaft secured to said piston, said shaft and said piston being subjected to the full shock thus displacing the fluid in said inner cylinder, and said resilient springs retarding the movement of said cylindrical members as the latter are subjected to the fluid pressure.

3. In shock absorbers, an outer cylinder, an inner cylinder, a cover closing one end of said cylinder and completing a fluid passageway from the inner cylinder to the space formed between the outer and inner cylinders, a piston reciprocally mounted in said inner cylinder, a splined shaft secured to said piston, a plurality of cylindrical members adapted to be subjected to fluid pressure, said cylindrical members having piston rings engaging said inner and outer cylinders, a plurality of springs encircling said inner cylinder and engaging with said cylindrical members, a cover closing the other end of said outer cylinder and said inner cylinder.

HENRY JOHN KENT.

REFERENCES CITED

The following references are of record in the file of this patent:

UNITED STATES PATENTS

| Number | Name | Date |
|---|---|---|
| 988,382 | Phelan | Apr. 4, 1911 |
| 1,378,281 | Ross | May 17, 1921 |
| 1,512,903 | Brenne | Oct. 28, 1924 |
| 1,733,467 | O'Neill | Oct. 29, 1929 |
| 2,233,227 | Ramey et al. | Feb. 25, 1941 |
| 2,357,505 | Crispell | Sept. 5, 1944 |

FOREIGN PATENTS

| Number | Country | Date |
|---|---|---|
| 737,073 | France | Sept. 27, 1932 |